United States Patent [19]
Cushing et al.

[11] Patent Number: 5,134,706
[45] Date of Patent: Jul. 28, 1992

[54] BUS INTERFACE INTERRUPT APPARATUS

[75] Inventors: David E. Cushing, Chelmsford; Ralph M. Lombardo, Jr., Lowell; Forrest M. Phillips, North Chelmsford, all of Mass.

[73] Assignee: Bull HN Information Systems Inc., Billerica, Mass.

[21] Appl. No.: 511,873

[22] Filed: Apr. 19, 1990

Related U.S. Application Data

[63] Continuation of Ser. No. 83,539, Aug. 7, 1987, abandoned.

[51] Int. Cl.$^5$ .............................................. G06F 9/46
[52] U.S. Cl. ...................... 395/725; 364/DIG. 1; 364/238.3241.5; 364/240.2
[58] Field of Search ... 364/200 MS File, 900 MS File

[56] References Cited

U.S. PATENT DOCUMENTS

| 3,881,174 | 4/1975 | Barnich | 364/200 |
|---|---|---|---|
| 4,268,906 | 5/1981 | Bourke et al. | 364/200 |
| 4,275,458 | 6/1981 | Khera | 364/900 |
| 4,296,464 | 10/1981 | Woods et al. | |
| 4,415,986 | 11/1983 | Chadra | 364/200 |
| 4,479,179 | 10/1984 | Dinwiddie, Jr. | 364/200 |
| 4,586,128 | 4/1986 | DeWoskin | 364/200 |
| 4,654,820 | 3/1987 | Brahm et al. | 364/900 |
| 4,669,057 | 5/1987 | Clark, Jr. et al. | 364/900 |
| 4,716,527 | 12/1987 | Graciotti | 364/200 |

Primary Examiner—Stuart N. Hecker
Assistant Examiner—Rebecca L. Rudolph
Attorney, Agent, or Firm—George Grayson; Lewis P. Elbinger; John S. Solakian

[57] ABSTRACT

A bus interface interrupt arrangement is disclosed which provides separate interrupt controllers for each bus in a multibus computer system where the processor is connected to one of the busses. Interrupt requests decided on each of the busses other than a primary bus to which the processor is connected are input along with interrupts from circuits connected to the primary bus to the interrupt controller for the primary bus. The interrupt request decided by the interrupt controller for the primary bus is connected to an interrupt input of the processor. All interrupt controllers are connected to the primary bus and may be accessed by the processor. When an interrupt from one of the busses other than the primary bus is chosen by the processor, the processor must read the interrupt controllers to determine first what bus, and then identify the circuit that generated the interrupt that has been acknowledged. Using this information circuits in the bus interface interrupt arrangement are operated to pass data and addresses between the primary bus and the chosen bus. These circuits are operated in a manner to pass data between busses having different data path sizes.

7 Claims, 4 Drawing Sheets

BUS INTERFACE INTERRUPT APPARATUS

This application is a continuation of application Ser. No. 07/083,539, filed Aug. 7, 1987, now abandoned.

FIELD OF THE INVENTION

This invention relates to interfaces providing communications between busses in a computer system.

BACKGROUND OF THE INVENTION

In the computer art busses made up of a number of paths are used to provide communication connections between equipment connected to a bus. More particularly, there are data, address and control leads that make up a bus. Equipment such as random access memory (RAM), floppy disks, processors, video controllers and other devices typically found in a computer system are connected to the bus. Through a priority scheme ones of the devices requesting access to another device are granted access to the bus. For a simple example, if the processor wants to access the RAM memory to read data therefrom, it first requests and is granted access to the bus. The processor places an identity code of the RAM on some of the control leads and information indicating that a read operation is to be performed on other control leads. The addresses of the locations in the RAM to be read out are sequentially placed on the address leads of the bus, and the data read out of the RAM is returned to the processor via the data leads. When the processor is finished reading and possibly writing the RAM, it relinquishes control of the bus for use by other devices connected thereto.

In some computer system configurations, such as the popular personal computers, there is only one bus. In some of these personal computers there are eight data leads as part of the bus, while in other personal computers there are sixteen data leads, and yet in other personal computers there are thirty-two data leads.

In other computer system configurations there are more than one bus. This permits more than one operation to be simultaneously performed via the multiple busses. Interfaces are often provided between the busses which also permits a circuit connected to one of the busses to be connected to a different circuit connected to another bus when necessary. To facilitate these inter-bus connections, each of the busses typically have the same data path, control path and address path sizes.

Typically, in the prior art, devices request access to a processor by providing an interrupt signal to one of the interrupt inputs of the processor. When the number of requesting devices gets large, there may not be enough interrupt ports to the processor and, in addition, the processor must spend more time arbitrating between interrupt requests. This is intolerable. Thus, there is a need in the art for bus interface interrupt apparatus that can arbitrate interrupt requests from a larger number of sources and from more sources than there are interrupt ports to the processor, and thereby reduce the time required for the processor to do same.

In a few instances the multiple busses within some computer systems have different bit size data paths. This creates problems in interfacing the different busses. Thus, there is a need in the art for bus interface interrupt apparatus that can connect computer busses having different bit size data paths and thereby permits communication between more devices. There is also a need for bus interface interrupt apparatus that is simple and operates with the busses in the same manner as other prior art devices connected thereto.

SUMMARY OF THE INVENTION

The above mentioned needs of the prior art are satisfied by the novel bus interface interrupt apparatus taught and claimed herein. The novel bus interface interrupt apparatus connects pairs of multiple busses having different data path bit sizes and requests access to each bus in the same manner that other circuits request and gain access to these busses. This mode of connection and access allows inter-bus operations without modification of the existing buss arrangements.

DESCRIPTION OF THE DRAWING

The invention is better understood when reading the following detailed description in conjunction with the drawing in which.

DETAILED DESCRIPTION

Figure 1:
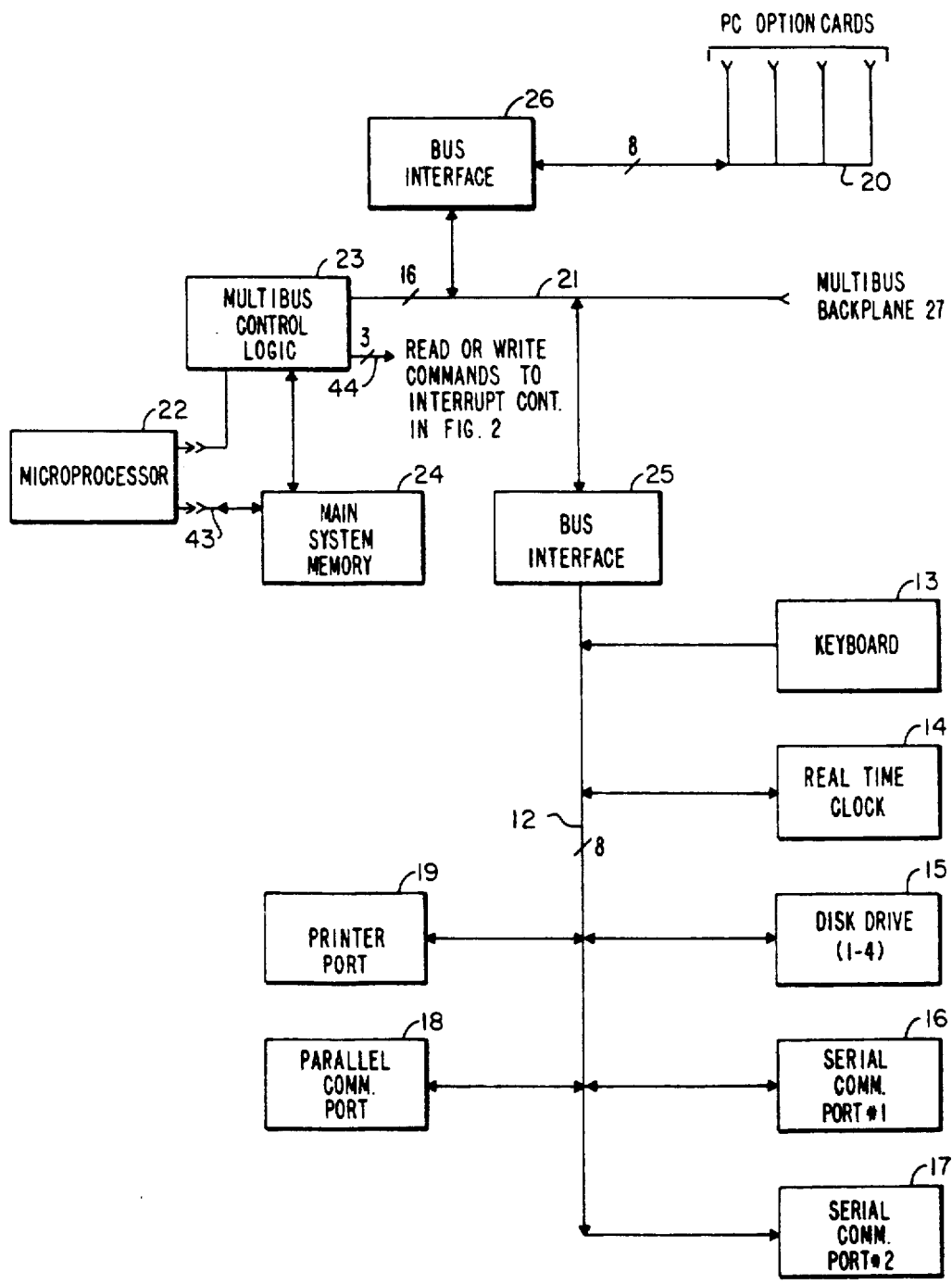
FIG. 1 is a general block diagram of a computer system having two busses of different data bit path size and interconnected by the novel bus interface interrupt apparatus.

In FIG. 1 is shown a general block diagram of a computer system having three busses utilizing two different data path bit sizes, and bus interfaces connecting pairs of the busses. The computer system generally shown in block diagram form in FIG. 1 is a modified personal computer system having three different busses instead of one bus. There is a first conventional bus 12 having eight data bits to which various well known input or output devices or ports are connected. Examples of these are keyboard 13, real time clock (lithium battery powered) 14, a combination of floppy and hard disk drives with associated controllers 15, serial communication ports 16 and 17, a parallel communications port 18, and a Centronics printer port 19. The standard for bus 12 is the IBM standard used in the IBM personal computers.

There is a second conventional bus 20 having eight data bits which is used to connect only plug-in expansions cards into the computer system. Such plug-in expansion cards include monochrome and color display driver cards, memory expansion cards, modems, and other expansion cards well known in the microcomputer art. Alike bus 12, bus 20 uses the IBM bus standard used in the IBM personal computers.

There is a third bus 21 which, in the embodiment of the invention described herein, has sixteen data bits. Bus 21 uses the IEEE 796 interface standard. A sixteen-bit microprocessor 22, such as the well known 80286 processor and its associated chip set, are mounted on a separate printed circuit board that plugs into a main printed circuit board to function with the other circuitry and devices mounted thereon or connected thereto. This is shown by the connector symbols adjacent to micro processor 22. Processor 22 connects to the sixteen data paths of bus 21 via control logic 23. Control logic 23 is advantageously an 8288 Bus Controller available from the Intel Corporation. There is also a main system memory 24 which may be of any convenient size from say six-hundred forty thousand bytes (640 Kb) to several megabytes. System memory 24 connects to the sixteen data paths of bus 21 via multibus control logic 23. Control logic circuit 23 also generates read and write command signals via the three leads 44 that are used to read interrupt registers in interrupt controllers shown in FIG. 2 and described further in this specification.

Processor 22 also has a direct memory access (DMA) port 43 to main system memory 24 to provide fast access thereto. By using DMA port 43 processor 22 does not have to go through an interrupt request and grant procedure to gain access to memory 24 via multibus 21.

The eight data leads of bus 12 are connected to the sixteen data leads of bus 21 via bus interface 25, and the eight data leads of bus 20 are connected to the sixteen data paths of bus 21 via bus interface 26. Bus interfaces 25 and 26 are identical so only one of them is described herein in detail with reference to FIGS. 2, 3, 4 and 5.

In addition, bus 21 is connected to a backplane 27 via which the computer system shown in FIG. 1 may be connected to other sixteen data bit computer systems, and via which other sixteen data bit devices may be connected to bus 21. The last mentioned other computer systems and devices are not shown but are well known in the art.

Figure 2:
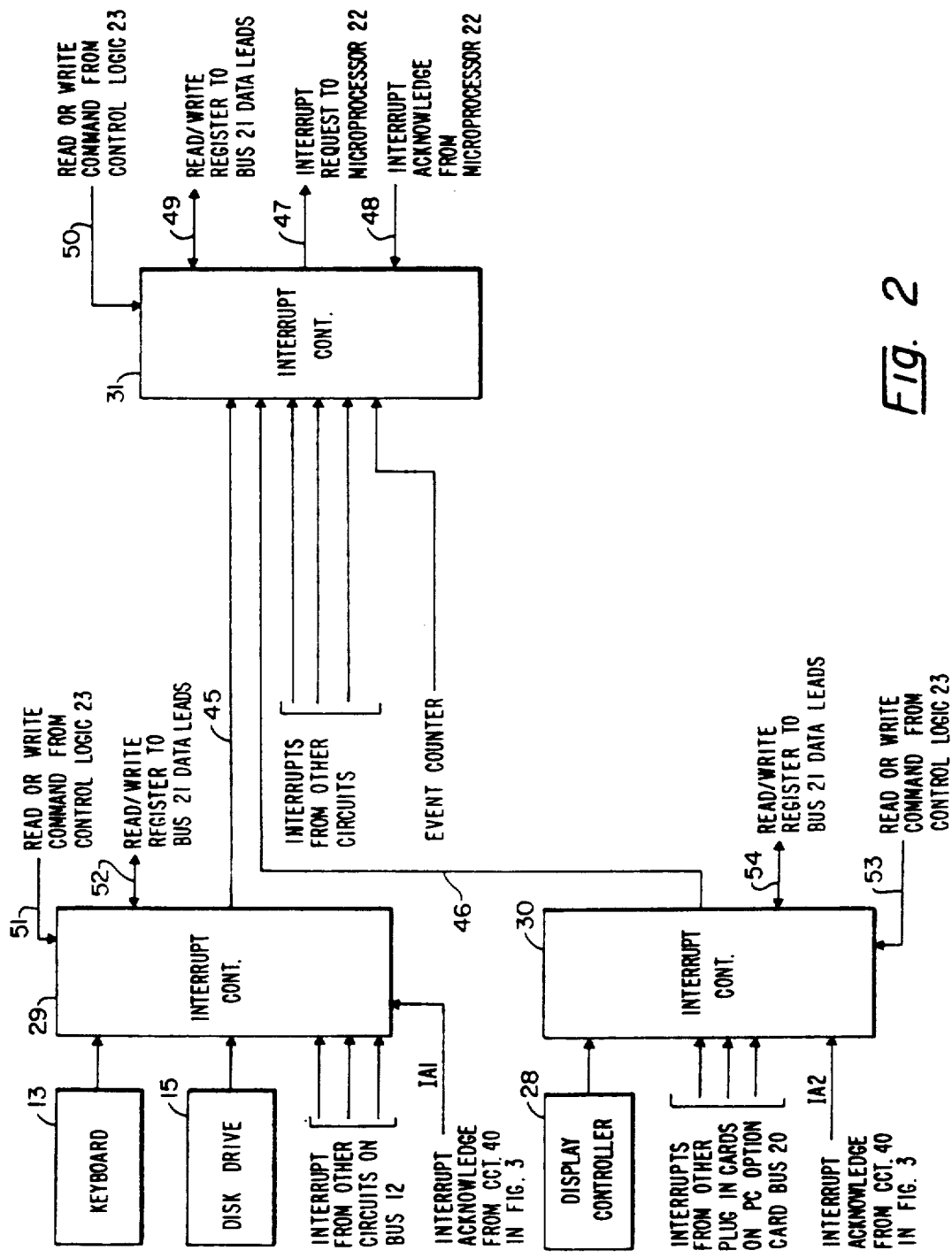
FIG. 2 is a block diagram of the interrupt control circuitry in the bus interface interrupt apparatus.

In FIG. 2 is shown a block diagram of the interrupt control circuitry for the bus interface interrupt apparatus in accordance with the teaching of the present invention. There are shown three interrupt controllers 29, 30 and 31 which are advantageously 8259A Interface Controller circuits commercially available from the Intel Corporation. These interrupt controllers have a number of interrupt inputs and the controllers decide between input interrupt requests on a priority basis. Priority is selected by which interrupt input a circuit is connected to. Interrupt controller 29 decides between interrupts from circuits connected to bus 12, interrupt controller 30 decides between interrupts from circuits connected to bus 20, and interrupt controller 31 decides between interrupts from circuits connected to bus 21 and grant interrupts from the output of interrupt controllers 29 and 30. In this embodiment of the invention main processor 22 never generates interrupts that are passed via the bus interface interrupt apparatus to either bus 12 or bus 20.

In the present embodiment of the invention, interrupt controller 29 in bus interface 25 has an event counter connected to its interrupt number 0 input, has the printer port 19 connected to the interrupt number 1 input, has first serial communications port 16 connected to the interrupt 2 input, has second serial communications port 17 connected to the interrupt 3 input, has first parallel communications port 18 connected to the interrupt 4 input, has a second parallel printer port (not shown) connected to the interrupt 5 input, has keyboard 13 connected to the interrupt 6 input, and a second printer port (not shown) connected to the interrupt 7 input. Disk drive 15 and keyboard 13 are connected to other interrupt inputs The pins of the 8259A chip to which these interrupt inputs are connected are found in the Intel integrated circuit manual. The particular interrupt inputs chosen may be changed by one skilled in the art.

Similarly, interrupt controller 30 in bus interface 26 has interrupt requests from plug in PC option cards plugged into the expansion slot connectors connected to its interrupt inputs 0, 1, and 2 through 7. One of these cards is a display controller 28. Interrupt controller 31 receives at its interrupt 2 input the winning or grant interrupt request output from interrupt controller 29, the winning or grant interrupt request output from interrupt controller 30 at its interrupt 3 input, and there is an interrupt input from an event counter at interrupt input zero. Interrupts from hardware (not shown) connected to sixteen-bit bus 21 via multibus backplane 27 may be connected to interrupt inputs of controller 31 as shown, or may be are connected directly to interrupt inputs of microprocessor 22. These may include interrupts from other central processing units (CPUs) connected to bus 21 via backplane 27. Although not shown or described above, there are other interrupt inputs to interrupt controllers 29, 30, and 31.

With the interrupt control apparatus shown in FIG. 2 circuits connected to eight-bit busses 12 and 20 go through two interrupt request and decision procedures before being connected to microprocessor 22 as described in the following paragraphs.

When an interrupt request is generated by some circuit connected to either bus 12 or 20 requesting access to main processor 22, the interrupt requests are first input to the interrupt controller (29 or 30 respectively) associated with the bus. That is, interrupt requests from circuits connected to bus 12 are inputs to interrupt controller 29 and interrupt requests from circuits connected to bus 20 are input to interrupt controller 30, as shown in FIG. 2. When there is more than one circuit on either bus 12 or 20 generating an interrupt, interrupt controllers 29 and 30 arbitrate between concurrent requests on their respective busses and each controller provides one winning or grant interrupt output (45 and 46 respectively) that is input to interface controller 31. In this manner interrupt controllers 29 and 30 appear the same to controller 31 as other circuits connected to bus 21. These connections are shown in FIG. 2. Interrupt controller 31 arbitrates between interrupt requests input to it and provides a winning or grant interrupt output 47 that is input to one interrupt input of microprocessor 22. As mentioned previously, interrupts from other circuits (not shown) connected to bus 21 via backplane 27 may be connected directly to standard interrupt inputs of processor 22 (not shown). They may also be input to interrupt controller 31 as shown.

In conventional mode of operation, when microprocessor 22 responds to an interrupt from interface controller 31 it must first determine which of the busses 12, 20 or 21 is the one to which the circuit is connected that generated the interrupt. To do this processor 22 causes control logic 23 to generate a read signal on the one of of leads 44 in FIG. 1 that goes to interrupt controller 31 in FIG. 2. This is lead 50. Controller 31 has an interrupt register (not shown) therein in which is stored an indication of the identity of the interrupt input to circuit 31 that has been granted. Responsive to the signal on lead 50 the contents of the interrupt register are read out via leads 49 onto data leads 10. Processor 22 knows from the last mentioned contents read out of the interrupt register onto data leads 10 of the bus whether that circuit is connected to bus 12, 20 or 21. This is all that is necessary when the interrupt originates from a circuit connected to bus 21, and an interrupt acknowledgement signal is sent to to interrupt controller circuit 31. The circuit connected to bus 21 is granted access via bus 21 to microprocessor 22 to perform some operation.

However, when the interrupt that has ultimately been recognized by processor 22 comes from a circuit connected to one of PC busses 12 or 20, that also is recognized by microprocessor 22 and more steps are performed. Processor then causes other signals to be generated by control logic circuit 23 onto others of leads 44 in FIG. 1.

When it has been determined that the circuit, the interrupt of which has been granted, is connected to bus 12, a read signal is placed on lead 51 which is input to interrupt controller 29. The contents of an interrupt register (not shown) in interrupt controller 29 are read out by microprocessor 22 via leads 52 onto data bus 10 and thence to microprocessor 22. Details of this interrupt register maybe found in the Intel Integrated Circuit Manual. From the contents of the interrupt register in interrupt controller 29 microprocessor 22 knows which circuit connected to bus 12 generated the interrupt that has been granted.

When processor 22 determines that the circuit, the interrupt of which has been granted, is connected to bus 20 the read signal is on lead 53 which is input to interrupt controller 30. The contents of the interrupt register (not shown) in interrupt controller 30 are read out via leads 54 onto data leads 10 and thence to microprocessor 22. From the contents of the interrupt register in interrupt controller 30 microprocessor 22 knows which circuit connected to bus 20 generated the interrupt that has been granted.

An acknowledgement signal must then be returned via the appropriate one of interface controllers 29 and 30 to the circuit that generated the interrupt request that has been granted. This also causes a connection to be set up through the bus interface interrupt apparatus, as described hereinafter, to permit the last mentioned circuit to be connected via the interrupt apparatus and bus 21 to microprocessor 22.

To return an interrupt acknowledgement to one of interrupt controllers 29 and 30 associated respectively with PC busses 12 and 20, microprocessor 22 first determines if the interrupt it has acknowledged comes from one of interrupt controllers 29 or 30 as described in the previous paragraphs. This determination is facilitated because interrupt controllers 29 and 30 appear the same as other circuits connected to bus 21. Knowing which circuit generated the granted interrupt, microprocessor 22 generates an interrupt acknowledgement address identifying the one of busses 12 or 20 to which the last mentioned circuit is connected. This interrupt acknowledgement address is input to an address decoder circuit 40 shown on FIG. 3. Address decoder 40 is not part of the address path shown in FIG. 3 and is only placed on this sheet of drawing for convenience. Address decoder 40 decodes the address input to it and provides an interrupt acknowledgement signal on one of its output leads IA1or IA2 that go to the interrupt controller 29 or 30 associated with the bus to which the acknowledged circuit is connected. Interrupt acknowledgement signal IA1 is input to interrupt controller 29 in FIG. 2, and interrupt acknowledgement signal IA2 is input to interrupt controller 30 in FIG. 2. Interrupt controllers 29 and 30 respond to the interrupt acknowledgement signals IA1 or IA2 they receive to return an interrupt acknowledgement to the circuit connected to their associated bus that has had its interrupt granted.

It is necessary for main processor 22 to determine which circuit generated an interrupt that it has acknowledged in order to pick an appropriate software routine to communicate with the last mentioned circuit after establishing a connection therewith through bus interface 25 or 26. The knowledge of which bus the circuit is connected to is also needed to be able to set up a path through the bus interface interrupt apparatus between multibus 21 and the one of busses 12 or 20 to which the chosen circuit is connected.

Figure 3:
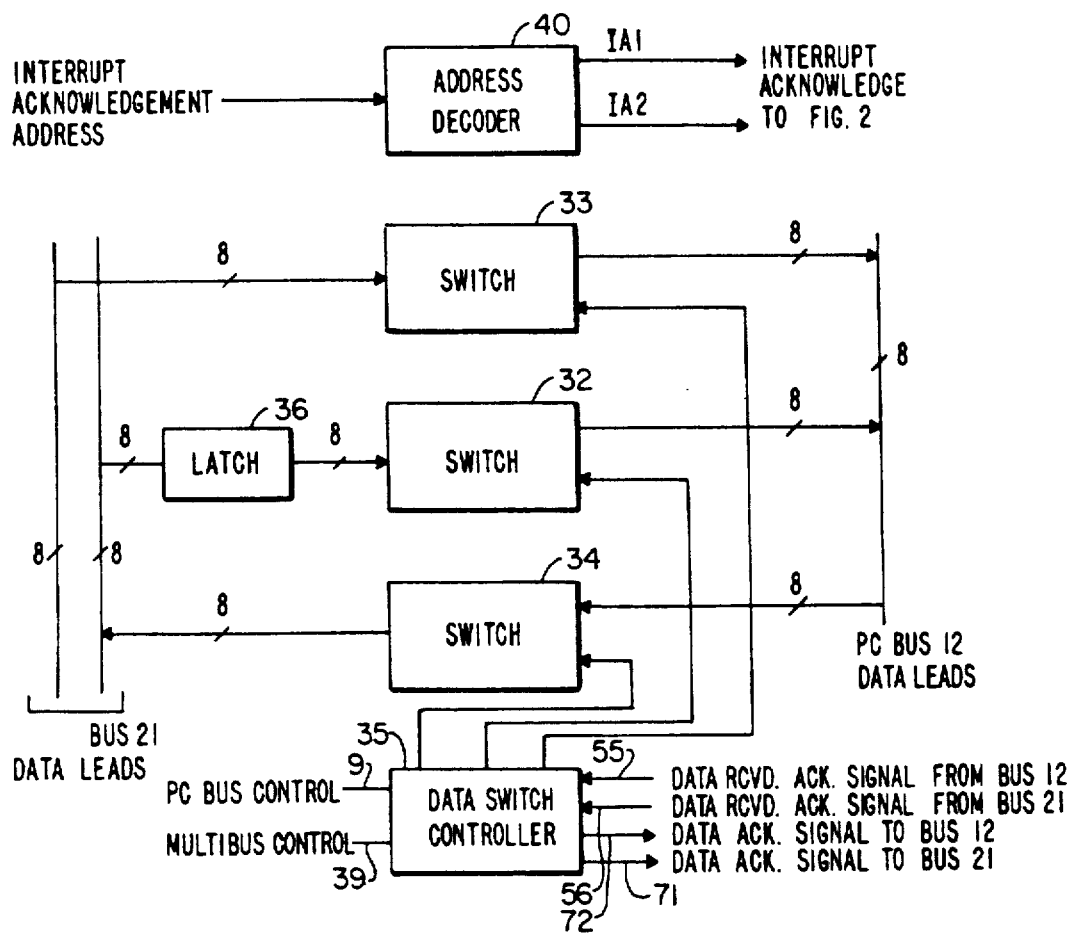
FIG. 3 is a block diagram of the switch circuitry in the bus interface interrupt apparatus for connecting data on one bus to another bus.

FIG. 3 shows the data path through bus interface 25 between the sixteen data bits of bus 21 and the eight data bits of PC bus 12. The apparatus and path through interface 26 between the data leads of multibus 21 and the data leads of PC bus 20 are the same as shown in FIG. 3. Accordingly, the circuitry of FIG. 3 for bus interface 26 is not shown in another figure and the circuit description is not repeated for the sake of brevity. As shown, there are three switches 32, 33 and 34. Circuits 32, 33 and 34 are advantageously 8287 Bidirectional Switches available from the Intel Corporation. Each of these switches comprises a number of individual gates (not shown) so that a number of data leads may be connected through each of the switch circuits. Each of switches 32, 33, and 34 is controlled by data switch controller 35 after an interrupt has been acknowledged and a decision has been made if data is to flow from multibus 21 to PC bus 12, or visa versa. Controller 35 is an Intel 82188 Data Switch Controller in this embodiment of the invention. As shown in FIG. 3 controller 35 has a number of inputs including data received acknowledgment signals on lead 55 from bus 12 and on lead 56 from bus 20. Data acknowledgement signals are generated by circuits after they receive data via a data bus to which they are connected, in a manner well known in the art. The data acknowledgement signals are returned to the circuits that transmitted the data, also in a manner well known in the art. When a data received acknowledgment signal is received by controller 35 it indicates that switches 32, 33 and 34 can be released and reoperated to transfer more data. In addition, a control signal is received on leads 9 from PC bus 12 and on leads 39 from multibus 21 to indicate the direction the data is to be transferred between the data leads 10 of bus 21 and data leads 11 of bus 12. Data switch controller 35 uses this information to determine which of switches 32, 33 or 34 to operate. When data is to go from bus 21 to bus 12, switches 32 and 33 are operated at appropriate times; and when data is to go from bus 11 to bus 21, switch 34 is operated.

Switch 32 has its inputs connected to latch 36 which in turn has its inputs connected to respective ones of the eight lower order leads (0-7) of the sixteen data leads 10 of multibus 21. Circuit 36 is advantageously an 8283 Latch available from the Intel Corporation. The eight output leads of switch 32 are connected to respective ones of the eight data leads 11 of PC bus 12. Switch 33 has its eight inputs connected to respective ones of the eight higher order leads (8-15) of the sixteen data leads 10 of multibus 21, and its eight output leads are connected to respective ones of the eight data leads 11 of PC bus 12. It can be readily appreciated that only eight data leads at a time of multibus 21 may be connected to the eight data leads 11 of PC bus 12, so only one of switches 32 and 33 is activated at a time as is described below.

Switch 34 has its eight inputs connected to respective ones of the eight data leads 11 of PC bus 12, and its eight outputs are connected to respective ones of the eight lower order data leads (0-7) 10 of multibus 21. These connections are such that when switch 34 is operated, data lead zero of PC bus 12 is connected to data lead zero of multibus 21, etcetera.

In operation, when a sixteen bit data word is being sent via multibus 21 to PC bus 12, it must of necessity be broken into two eight-bit data words. As is known in the art, when a sending circuit places a data word on a bus after having been granted access thereto, the data word is left on the bus until an acknowledgement signal is returned and received by the sending circuit. The acknowledgement signal is an indication by the designated receiving circuit that it has received the data word placed on the data bus. Thus, when a sixteen-bit data word is to be transferred from multibus 21 to PC bus 12, it is placed on the sixteen data leads 10 of multibus 21 by the sending circuit. Data switch controller 35 first energizes switch 32 to connect the eight lower order data leads (0-7) of multibus 21 to the eight data leads 11 of PC bus 12. When the receiving circuit connected to bus 12 receives these lower order eight bits it returns an acknowledgement signal to data switch controller 35. Controller 35 does not yet return an acknowledgement signal to the sending circuit (possibly processor 22) connected to multibus 21.

Responsive to the receipt of the acknowledgement signal from the receiving circuit, data switch controller 35 deenergizes switch 32 and then energizes switch 33. In this manner the eight higher order data leads (8-15) of multibus 21 are then sequentially connected to the eight data leads 11 of PC bus 12. Responsive to receiving this second eight bit word the receiving circuit returns a second acknowledgement signal via lead 56 to data switch controller 35. Controller 35 responds to this second acknowledgement signal from the receiving circuit to first deenergize switch 33 and then generate an acknowledgement signal that is returned via lead 71 to the sending circuit connected to multibus 21. The sending circuit thereby knows that the sixteen bit word it placed on the data leads 10 of bus 21 has been received by the designated receiving circuit and it then removes the word from the data leads 10 of bus 21. Thereafter, another sixteen-bit word may be placed on the data leads 10 of multibus 21, in which case the operation just described is repeated. Alternatively, when the sending circuit has completed its transmission it may release multibus 21 to be used by another circuit that gains access thereto by having its interrupt request granted.

When an eight bit data word is to be sent from a sending circuit connected to PC bus 12 to a receiving circuit, such as microprocessor 22, connected to multibus 21, the sending circuit first gains access to PC bus 12 via the operation of interrupt controller 29, as previously described, and sends an appropriate signal to data switch controller 35. After the interrupt circuitry of FIG. 2 has bid for and the sending circuit has been granted access to multibus 21, data switch controller 35 energizes switch 34. Thereby, the eight data leads (0-7) of PC bus 12 are connected to the respective ones of the eight lower order data leads (0-7) of multibus 21. When the receiving circuit connected to multibus 21 receives this eight-bit data word it returns a data received acknowledgement signal to data switch controller 35 via lead 55. In response thereto, controller 35 generates a data acknowledgement signal which is then returned via lead 71 to the sending circuit connected to PC bus 12. Thereafter, the sending circuit may transmit another data word, in the manner just described, or may release PC bus 12 for use by another circuit.

Figure 4:
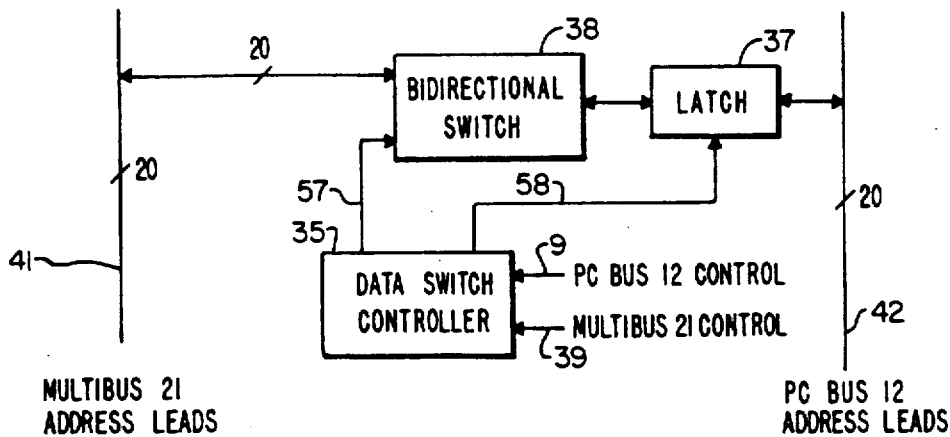
FIG. 4 is a block diagram of the switch circuitry in the bus interface interrupt apparatus for connecting address leads of one bus to those of another bus.

In FIG. 4 is shown a block diagram of the circuitry in bus interface 25 for connecting addresses between address leads of PC bus 12 and to the address leads of multibus 21. While FIG. 4 shows the circuitry connecting busses 12 and 21 there is identical circuitry in bus interface 26 that is used to connect the address leads of PC bus 20 to the address leads of multibus 21. Accordingly, this identical circuitry is not shown or described in this specification for the sake of brevity.

Bus 21 has twenty address leads 41 and standard IBM PC bus bus 12 also twenty address leads. When an address generated by a circuit connected to bus 12, the interrupt request of which is acknowledged, is to be sent to main processor 22 it is first stored in bidirectional latch 37. Latch 37 is preferably an Intel 8283 Octal Latch. An address stored in latch 37 is connected to the least significant twenty address leads 41 of multibus 21 by operating bi-directional switch 38. Switch 38 is preferably an Intel 8287 Octal Bus Transceiver. When an address is being sent from main processor 22 to the circuit the interrupt from which was acknowledged, processor 22 places the address on the twenty least significant address leads 41 of multibus 21. Switch 38 is then operated and the address is stored in latch 37. The address stored in latch 37 is placed on the address leads 42 of bus 12 from which it is received by the last mentioned circuit. In this manner processor 22 may address the circuit, or the circuit may send addresses to processor 22. Switch 38 is operated by data switch controller 35 via lead 57. Controller 35 responds to bus control signals input to it via leads 9 and 39 to know when and how to operate bidirectional switch 38 and latch 37 via leads 57 and 58.

Figure 5:
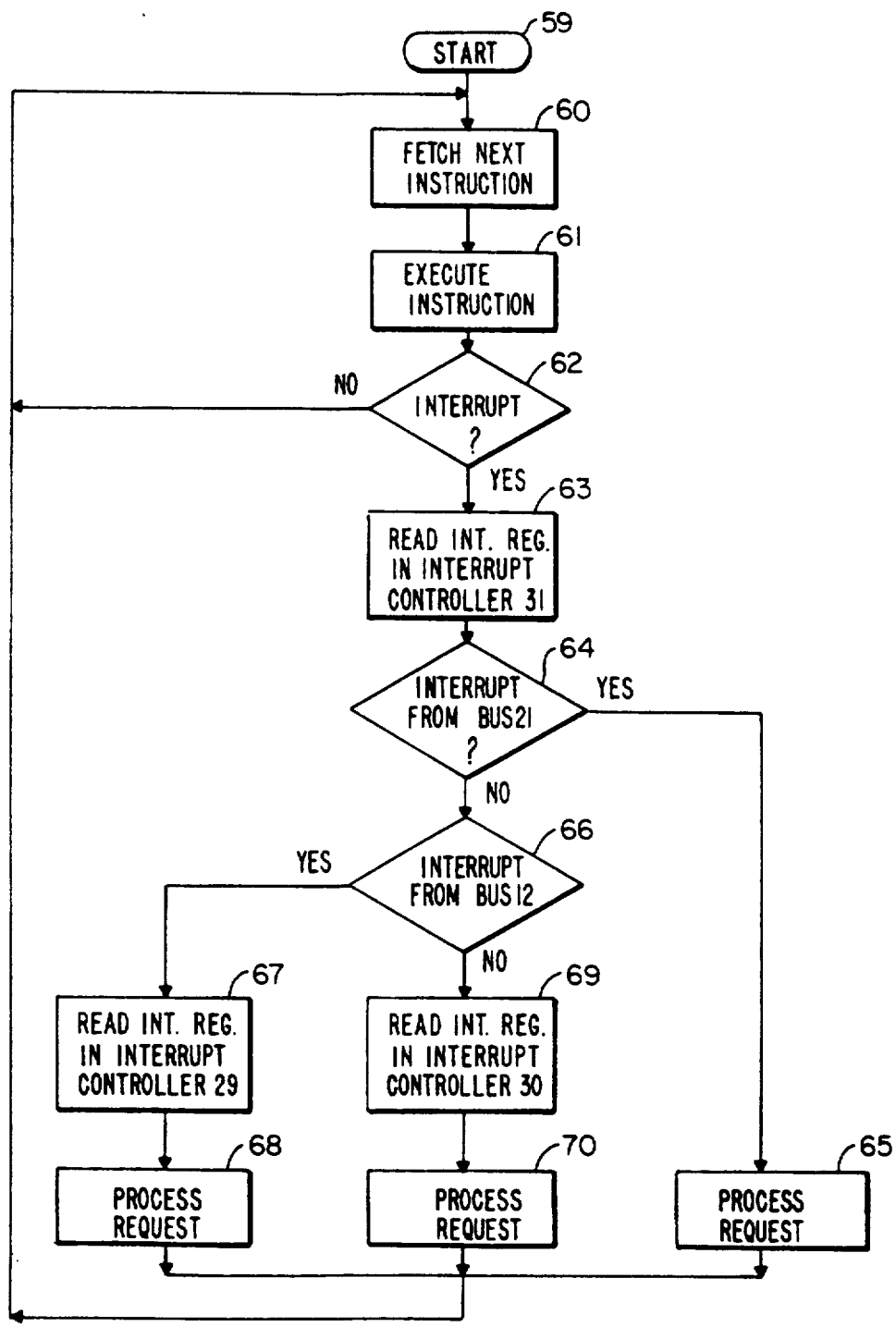
FIG. 5 is a flow chart of the steps performed by a system processor in implementing the invention.

In FIG. 5 is shown a block diagram flow chart of the operations performed by microprocessor in recognizing interrupts input to it, and identifying the circuits from which they come. The general operation has been previously described. After microprocessor 22 commences processing at block 59 in a manner well known in the art, at block 60 it fetches the first instruction of a program it is running, and at block 61 it executes that instruction. Thereafter, without the need for an extra machine cycle, at block 62 processor 22 checks to see if there is an interrupt at any of its interrupt inputs. If there are none, processor 22 returns to block 60 to fetch the next program instruction and again execute same.

If an interrupt is detected, the operation branches to block 63 and the interrupt register (not shown) in interrupt controller 31 associated with multibus 21 is read out as previously described. The interrupt register contents are checked at block 64 to identify if the circuit that generated the interrupt is connected to bus 21. If the circuit is connected to bus 21, the operation branches to block 65 and the process requested by the identified circuit is processed by connecting microprocessor 22 to the last mentioned circuit and performing operations in a manner well known in the art.

When it is determined at block 64 that the interrupt did not originate with a circuit connected to bus 21, the operation goes to block 66 where it is next determined if the interrupt originated from PC bus 12. If the determination at block 66 is that the interrupt did originate from a circuit connected to bus 12, the operation branches to block 67 and the contents of the interrupt register in interrupt controller 29 are read out to identify what circuit connected to bus 12 generated the interrupt. At block 68 a requested process from the last identified circuit connected to bus 12 is then processed.

Alternatively, if the decision at block 66 is no, the logical conclusion is that the interrupt must have come from a circuit connected to bus 20. Accordingly, at block 69 the contents of the interrupt register in interrupt controller 30 are read out and analyzed to identify which circuit connected to bus 20 generated the interrupt. The operation then goes to block 70 and the requested process from the identified circuit is performed. No matter which bus a circuit is connected to, after its interrupt is recognized and processing occurs the operation returns to block 60 to fetch the next program instruction and then executes same at block 61. The operation just described with reference to FIG. 5 is then repeated.

While what has been described hereinabove is the preferred embodiment of the invention, it will be recognized by those skilled in the art that numerous changes may be made without departing from the spirit and scope of the invention. For example, a thirty-two bit bus may interface with the eight-bit PC busses, or with a sixteen-bit bus. Further, the number and interconnection of the interface controllers my be varied.

What we claim is:

1. Interrupt apparatus for use in a computer system of the type having a processor and a plurality of devices, wherein each device upon requiring the processing services of said processor generates an interrupt signal, and wherein said processor responds to signals representing interrupt requests to perform said processing services, said interrupt apparatus comprising:

first (12) and second (21) busses;

a first controller (19) coupled to said first gus and having a plurality of input terminals coupled to receive respective interrupt signals from each of a first plurality of said devices coupled to said first bus, a first output terminal (45) coupled to said second bus for delivering an output interrupt signal representing an interrupt request by said first controller, and a first register, said first controller, upon receipt of at least one of said interrupt signals at said input terminals thereof, making a selection of one of said received interrupt signals, and upon making such selection, delivering said output interrupt signal at said first output terminal and entering into said first register an identification of the source device of the interrupt signal selected thereby;

a second controller (31) coupled to said second bus and having a plurality of input terminals coupled to receive respective interrupt signals from each of a second plurality of said devices coupled to said second bus and said output interrupt signal delivered by said first controller, a second output terminal (47) coupled to said processor for delivering said interrupt request signal to said processor, and a second register, said second controller, upon receipt of at least one of said interrupt signals at said input terminals thereof, making a selection of one of said received interrupt signals and, upon making such selection, delivering said interrupt request signal at said second output terminal and entering into said second register an identification of the source of the interrupt signal selected thereby;

means (49, 50, 51, 52) coupling said processor to said controllers for enabling said processor to read the contents of said first and second registers, said processor upon receipt of said interrupt request signal delivered at said second output terminal generating a signal to read the contents of at least one of said first and second registers to determine the recognized source of the interrupt request represented by said interrupt request signal; and controllable switching means (30, 32, 33, 34, 35) for coupling together said first and second busses, said processor, upon determining that one of said first plurality of devices is the source of an interrupt request represented by said interrupt request signal, actuating said switching means, thereby providing a data communication path between said one device and said processor over said coupled first and second devices.

2. The interrupt apparatus of claim 1, wherein said processor, upon receipt of said interrupt request signal, first generates a signal to read the contents of said second register, and if such contents are determined by said processor to identify the first controller as the source of the interrupt selected by said second controller, next generating a signal to read the contents of said first register.

3. The interrupt apparatus of claim 1, further a gating arrangement connected between said first bus and said second bus, said gating arrangement used for establishing a data path between said first and said second busses so that data may be passed back and forth between one of said devices coupled to said first bus and said processor when an interrupt request by said first controller is selected by said second controller.

4. The interrupt apparatus of claim 3, further comprising:

a data switch controller responsive to a first control signal from said second bus and to a second control signal from said first bus for selectively operating said gating arrangement to pass data between said first and said second busses.

5. The interrupt apparatus of claim 4, wherein said gating arrangement comprises:

a first gate circuit connected between said first and said second busses and being enabled by said data switch controller when data is to be passed from said first bus to said second bus, and a second gate circuit connected between said first and said second busses and being enabled by said data switch controller when data is to be passed from said second bus to said first bus.

6. The interrupt apparatus of claim 5, wherein said first bus carries a first number of data bits and said second bus carries a second number of data bits and said first number of data bits is less than said second number of data bits, wherein said first gate circuit has an input connected to a first portion of the data leads of said second bus and its output is connected to said first bus, and further comprising:

a third gate circuit having an input connected to a second portion of the data leads of said second bus and an output connected to said first bus, said data switch controller first operating said first gate circuit and then subsequently operating said third gate circuit in order to pass data made up of said second number of data bits on said second bus to said first bus.

7. The interrupt apparatus of claim 6, further comprising:

a latch for storing addresses on address leads of said first and said second busses, said latch being under control of said data switch controller; and a bidirectional switch connected in series with said latch, and both of them being connected between the address leads of said first bus and said second bus, said switch being operated by said data switch controller to selectively pass addresses between said first and said second busses.

* * * * *